O. & M. HELGESON.
COMBINATION CART.
APPLICATION FILED FEB. 12, 1908.
909,297.
Patented Jan. 12, 1909.
3 SHEETS—SHEET 1.
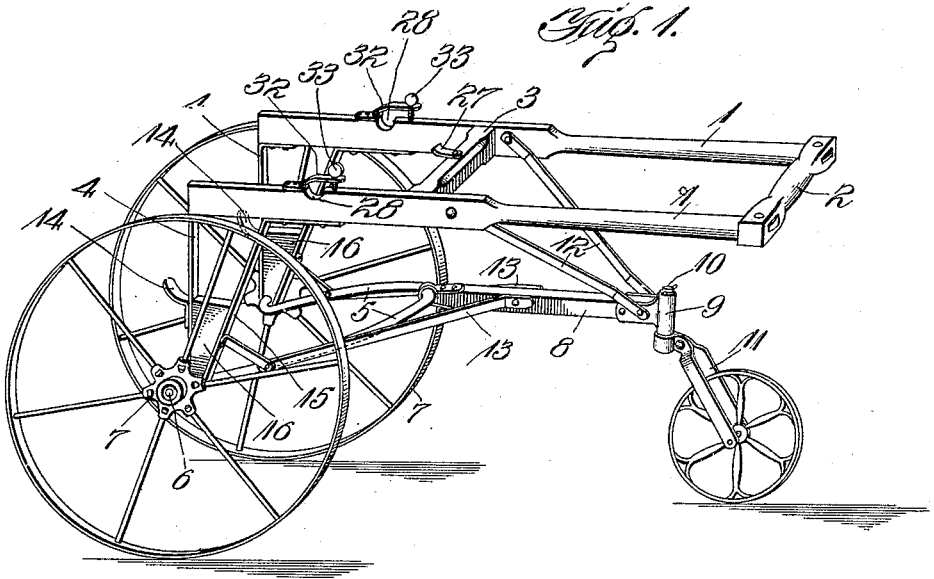
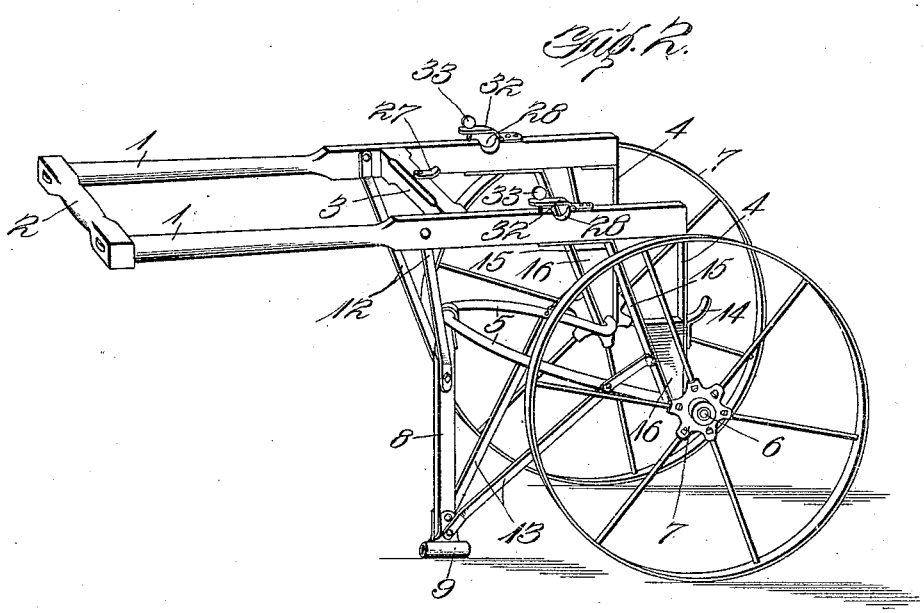
Witnesses:
Paul J. Gathman
E. O. Hildebrand
Inventors:
Martin Helgeson and
Oscar Helgeson
By Georgii & Massie
Attorneys.

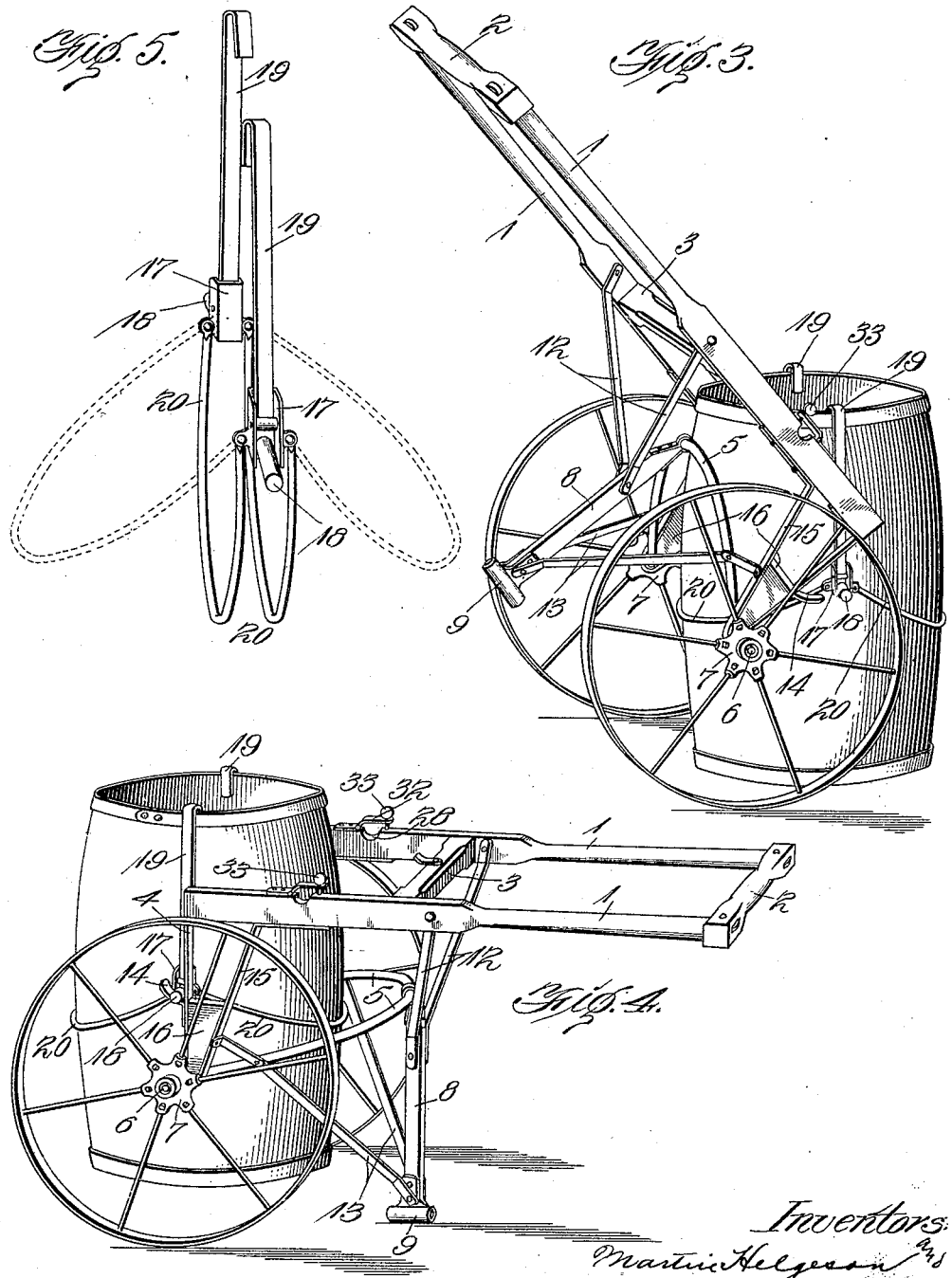

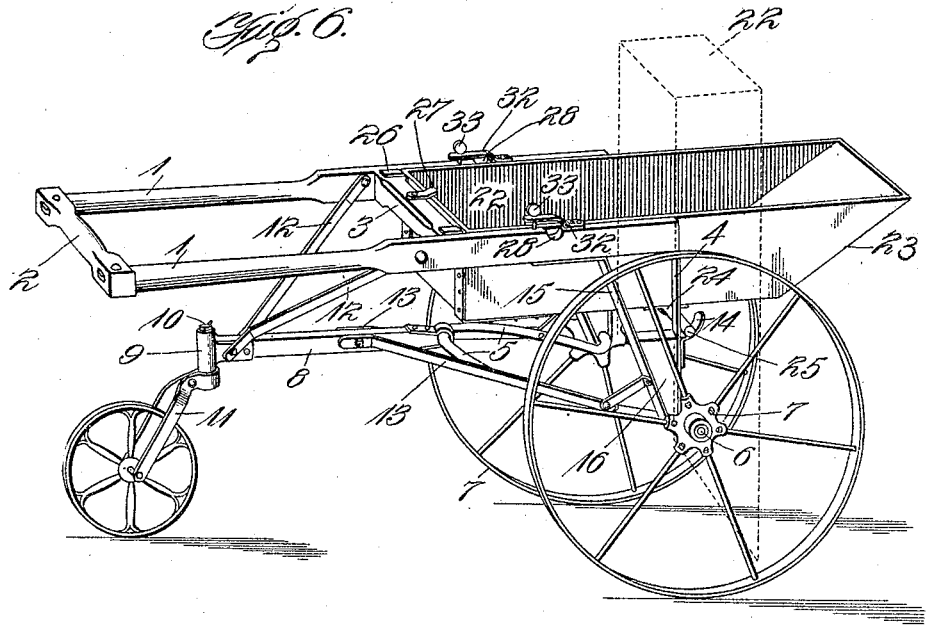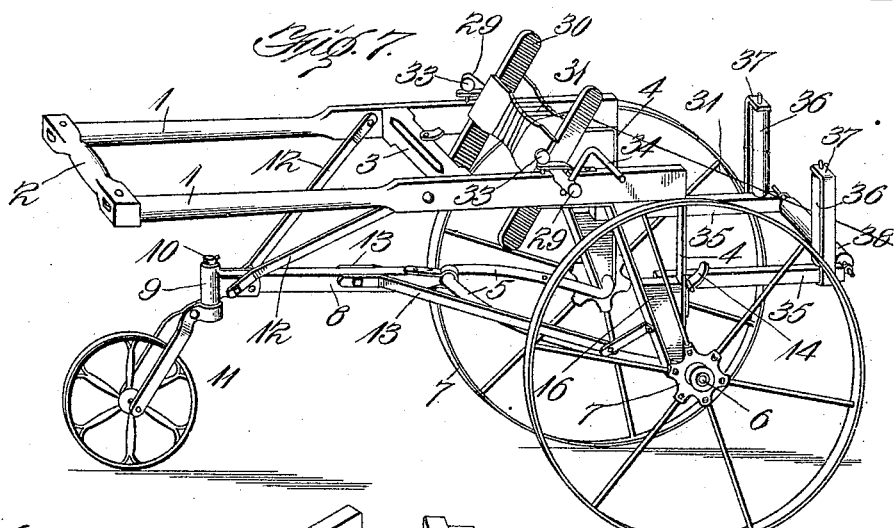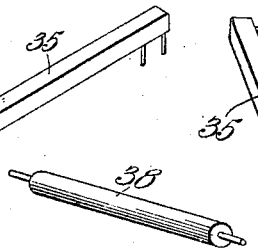

UNITED STATES PATENT OFFICE.

OLAUS HELGESON AND MARTIN HELGESON, OF MADELIA, MINNESOTA.

COMBINATION-CART.

No. 909,297.   Specification of Letters Patent.   Patented Jan. 12, 1909.

Application filed February 12, 1908.   Serial No. 415,496.

*To all whom it may concern:*

Be it known that we, OLAUS HELGESON and MARTIN HELGESON, citizens of the United States, residing at Madelia, in the county of Watonwan, State of Minnesota, have invented certain new and useful Improvements in Combination-Carts; and we do hereby declare the following to be a full, clear, and exact description of the invention, such as will enable others skilled in the art to which it appertains to make and use the same.

Our invention relates to combination carts, especially to general utility carts for use on the farm, and particularly to a cart adapted to serve interchangeably as a feed dump cart, a barrel cart, and a reel carrier.

The invention as hereafter more fully described, and as particularly set out in the claims, will be readily understood from the accompanying drawings illustrating a preferred embodiment thereof, in which drawings:

Figure 1 is a view of the cart frame equipped with a caster wheel; Fig. 2 is a similar view, the caster wheel removed and its bearing support constituting a rigid leg; Fig. 3 represents the device as a barrel cart, in the act of lifting a barrel; Fig. 4 is a similar view with the barrel elevated; Fig. 5 is a detail of the barrel clamp; Fig. 6 shows the device as a feed cart; Fig. 7 illustrates its conversion into a reel carrier; and Fig. 8 shows disassociated details of the reel carrier.

As illustrated, the cart frame comprises horizontal members 1 connected by a cross bar 2, serving as a handle, and by a second cross bar 3, the horizontal members being rigidly secured to vertical members 4 which may be of wood or of metal, as shown. The vertical members at their lower end are secured to the extremities of a yoke 5 having laterally extending spindles 6, upon which the wheels 7 are mounted. Upon the yoke, at its central portion, is pivoted the reach 8, having at its extremity a thimble 9, serving as a bearing for the spindle 10 of the caster wheel 11. Braces 12 are pivoted at one end to the horizontal members of the cart frame in their medial portion, and bolted at the other end to the reach near the thimble. A second pair of braces 13 are pivoted at one end to the yoke 5 and at the other end bolted to the reach at a point near its pivotal connection with said yoke. By these braces the reach is held rigidly in a horizontal position beneath and parallel to the horizontal members of the cart frame, the whole constituting a rigid skeleton cart with a caster wheel adapting the same to be propelled either forwardly or backwardly with equal facility.

If it is desirable to have the cart provided with a rigid leg instead of a caster wheel, this is readily attained by removing the spindle 10 of the caster wheel from the thimble 9 and then disconnecting the members 12 and 13 from the reach, dropping the reach to a vertical position with the thimble resting upon the ground as a foot, and transposing the point of connection between the braces and reach, *i. e.* connecting the braces 12 with the upper portion of the reach near the yoke 5, and braces 13 with the lower end of the reach near the thimble 9. Thus, the cart frame is readily converted from that type of cart shown in Fig. 1, to that shown in Fig. 2.

Upon the vertical members of the frame at a point slightly above the axle bearings, are provided ears 14 to receive the trunnions of a barrel or of a feed box as may be desired. In order to secure additional rigidity, when so used, the cart may be further provided with diagonal braces 15, extending from the lower portion of the vertical members to the horizontal members, the acute angle formed between these members and the vertical members in the horizontal plane of the ears 14 being filled by blocks 16.

To adapt an ordinary barrel to be lifted and carried by this cart frame, we provide a pair of blocks 17 having laterally extending pintles 18 which form trunnions. These blocks are arranged to be suspended by hooked straps 19 from the upper edge of the barrel and upon opposite sides thereof. Pivoted to the sides of the blocks and connecting the same are bails 20 together embracing a larger area than the cross sectional area of the barrel 21 in the plane of the suspended trunnions so that their intermediate portions drop by gravity to a position below the trunnions.

When it is desired to lift a barrel so equipped, the handle of the cart is raised as shown in Fig. 3, and the ears 14 brought beneath the trunnions 18 when the handle is lowered as shown in Fig. 4 and the barrel elevated upon the ears, the barrel being firmly held frictionally by the bails 20 which occupy positions on the opposite sides of said barrel below its greatest diameter. So held, the barrel can be easily transported to any point and then deposited by reversing the operation, the cart being equally well adapted to the purpose, whether provided with or without the caster wheel, the use or non-use of said wheel being controlled by other circumstances.

As a feed cart, a feed box 22 having preferably a sloping front edge 23, is fitted upon its bottom and at each side with a rod 24 projecting sufficiently from the sides to form trunnions 25 arranged to be engaged by the ears 14, as described with reference to the barrel trunnions, and elevated in a similar manner. With the trunnions resting in the ears 14, the box is adapted to swing to a horizontal position between the side members 1 of the cart frame. Lips 26 formed upon the upper rear edge of the box contact with the cross bar 3 and prevent the rear edge of the box from dropping to a lower position, while a button 27 is pivoted upon the cross bar and arranged to be turned above the rear edge of the box to prevent its being accidentally raised, thus holding the same securely as shown in full lines in Fig. 6, while the box may be readily dumped by releasing this button, as shown in dotted lines in said figure.
The side members 1 are provided in their upper edge at a point beyond the cross bar 3 with notches 28 forming bearings for the trunnions or spindles 29 of a reel 30 of wire, rope, or the like 31. Above the notches are arranged keepers 32 suitably secured at one end to the side members, as by a hinge, and at the other end provided with a set screw or similar device 33 by which they may be drawn downwardly upon the reel spindles with such degree of force as may be desired to obtain a braking effect. The reel would ordinarily be provided with a crank 34 for turning the same. When the cart is to be used as a reel carrier, guide rollers are found to be advantageous and provision is made for the same by horizontal extension members 35 bolted at their inner ends to the blocks 16 or to any other suitable portion of the cart frame. The outer ends of these members are preferably provided in their upper faces with holes serving as bearings for the spindles at the lower ends of the vertical rolls 36 and metal straps 37, secured at the lower ends to the extension members, are inwardly turned at their upper ends and perforated to form bearings for the spindles at the upper ends of the rolls 36, whereby said rolls are supported for rotation in a vertical position. The outer ends of the extension members are provided with perforated studs in which are journaled the spindles at each end of the horizontal roll 38, the wire or rope 31 being guided to and from the reel by a single horizontal and the two vertical rolls.
It will thus be readily seen that the combination cart forming the subject of this invention, is adapted to be readily transformed into a feed or barrel cart or a reel carrier; also, into a cart having a rigid leg, or provided with a caster wheel, thereby conferring upon the possessor all the advantages possessed by each of such carts with the expense of but one, and that one, adapted to all circumstances which may arise.
Having thus fully described our invention, what we claim as new and desire to secure by Letters-Patent is:

1. In a cart, the combination, with the axle and the two main wheels, of a member arranged to form interchangeably a third point of support and a bearing for a caster wheel.

2. In a cart, the combination with the main axle, and its supporting wheels, of a reach extending horizontally as a bearing for a caster wheel and arranged to be turned into a vertical position to form a rigid supporting leg.

3. In a cart, the combination with the main axle, and its supporting wheels, of a reach pivoted to the axle, and braces arranged to fix the reach interchangeably in a horizontal and vertical position to serve as a bearing for a caster wheel and as a rigid leg.

4. In a cart, the combination with the main axle, and its supporting wheels, of a reach pivoted at one end to the axle and having at its opposite end a bearing for a caster wheel, a brace pivoted at one end to the axle, a second brace pivoted at one end to the cart frame, and means to secure the free ends of the braces interchangeably to the reach at a point near the two ends thereof, whereby the reach is rigidly held at will in a horizontal position as a bearing for a caster wheel and in a vertical position as a leg.

5. In a cart, the combination, with the main axle, of supporting wheels, a frame carried by the axle having upwardly turned ears and provided with notches in the upper faces of its side members, and a member arranged to interchangeably form a third point of rigid support and a bearing for a caster wheel, the ears and notches constituting bearings adapted to receive load receptacles and support the same in a position between the side members.

6. The combination with a load receptacle of nonuniform diameter, a pair of trunnions arranged on each side of the receptacle near the central portion thereof, and two bails connecting the trunnions and hanging therefrom on each side of the receptacle below its larger diameter, of means to lift the trunnions and support the load receptacle by the frictional engagement of the bails with the receptacle sides.

7. The combination, with a barrel, a pair of trunnions, means to suspend the trunnions on each side of the barrel near the central portion thereof, and two bails connecting the trunnions and hanging therefrom on each side of the barrel below its largest diameter, of means to lift the trunnions and elevate the barrel by frictional engagement of the bails with the barrel sides.

8. In a cart, the combination, with the main axle, supporting wheels, a frame, and upwardly turned ears carried by the frame, of a barrel, a pair of trunnions, means to suspend the trunnions on each side of the barrel near the central portion thereof, two bails connecting the trunnions and hanging therefrom on each side of the barrel below its largest diameter, the trunnions arranged to enter the ears and support the barrel by frictional engagement of the bails with the barrel sides.

9. In a cart, the combination, with the main axle, supporting wheels, a frame carried by the axle and comprising vertical and horizontal side members, ears carried by the vertical members, a cross bar connecting the horizontal members, and means forming a third point of support for the cart frame, of a barrel having laterally extending trunnions loosely suspended from the rim thereof, bails connected with the trunnions and hanging on each side of the barrel below its largest diameter, the trunnions arranged to enter the ears and the barrel thus carried occupying a position between the side members of the cart.

10. In a cart, the combination, with the main axle, of supporting wheels, a frame comprising vertical and horizontal side members, the vertical members provided with upturned ears and the horizontal members with notches in their upper faces, a cross bar connecting the horizontal members, a reach pivoted at one end to the axle and provided at its opposite end with a thimble bearing for a caster wheel, and braces arranged to fix the reach interchangeably in a horizontal position to carry a caster wheel and in a vertical position to serve as a leg, the ears and notches constituting bearings arranged to receive load receptacles and support the same in a position between the side members.

In testimony whereof we hereunto affix our signatures in the presence of two witnesses.

OLAUS HELGESON.
MARTIN HELGESON.

Witnesses:
A. F. MEYER,
C. S. DAHL.